United States Patent [19]
Wong et al.

[11] Patent Number: 5,747,976
[45] Date of Patent: May 5, 1998

[54] CONSTANT ON-TIME ARCHITECTURE FOR SWITCHING REGULATORS

[75] Inventors: Hok-Tung Wong, San Jose; Charles L. Vinn, Milpitas, both of Calif.

[73] Assignee: Raytheon Company, Del.

[21] Appl. No.: 622,098

[22] Filed: Mar. 26, 1996

[51] Int. Cl.$^6$ ....................................... G05F 1/56
[52] U.S. Cl. ................ 323/282; 323/285; 323/283
[58] Field of Search .................... 323/282, 285, 323/283; 363/15, 95

[56] References Cited

U.S. PATENT DOCUMENTS 4,350,891  9/1982  Wuerflein ........................... 378/110

OTHER PUBLICATIONS

Maxim Dual–Output Power–Supply Controller for Notebook Computers, Rev. 1; May 1994.
Linear Technology Synchronous Regulator Controller for N–or–P Channel Mosfets, Initial Release, Feb. 1995.

*Primary Examiner*—Peter S. Wong
*Assistant Examiner*—Rajnikant B. Patel
*Attorney, Agent, or Firm*—Townsend and Townsend and Crew, LLP

[57] ABSTRACT

A switching voltage regulator whose switching frequency decreases with reduced load currents is disclosed. The switching voltage regulator includes a current-controlled oscillator that varies the frequency of switching by changing the off-time of the switch and maintaining a constant on-time. The lower frequency as a result of the constant on-time switching reduces switching loss and power consumption at lower load currents. The constant on-time architecture of the present invention significantly improves the overall efficiency of the switching voltage regulator, while reducing component count and die size.

16 Claims, 4 Drawing Sheets

CONSTANT ON-TIME ARCHITECTURE FOR SWITCHING REGULATORS

BACKGROUND OF THE INVENTION

The present invention relates in general to switching regulators, and in particular to a method and circuitry for a constant on-time switching regulator.

Many of today's battery powered consumer products such as notebook computers and cellular phones operate with more than one power supply voltage level. For example, a central processing unit (CPU) for a portable personal computer may be designed to operate at 2.9 volts while the hard disk drive operates at 5 volts. Instead of providing several sources of power, these systems typically use a single power supply source and generate the others with DC—DC converters. The DC—DC conversion is typically performed by the power supply regulator circuitry that is almost universally provided in battery operated electronic products.

There are basically two types of power supply regulators, linear and switching regulators. Linear regulators rely on a linear control element (typically the effective resistance of a pass transistor) with feedback to regulate or obtain a constant voltage. When a linear regulator is used as a DC—DC converter, there is always an appreciable amount of power dissipation [the average value of $I_{out}(V_{in}-V_{out})$].

In a switching regulator, a transistor operating as a switch periodically applies the input voltage across an inductor for short intervals. Since the input voltage is switched on and off to transfer just enough charge to the load without going through energy dissipating elements, an ideal switching regulator dissipates zero power. There are several types of switching regulators, step-down, step-up, and inverting regulators. Although there are different ways to realize switching conversion, the most common method uses inductor and capacitor as energy storage elements and a MOSFET as the switching element.

FIG. 1 shows an example of a typical step-down switching regulator. When switch 100 is closed, $V_{out}-V_{in}$ is applied across inductor 102, causing a linearly increasing current (dI/dt=V/L) to flow through inductor 102 and smoothing capacitor 104. When switch 100 opens, inductor current continues to flow in the same direction, with clamp diode 106 starting to conduct. Diode 106 clamps the voltage across the inductor causing the inductor current to decrease linearly. A switch control circuit 108 includes an error amplifier that compares the output voltage with a reference voltage and generates a signal with either controlled pulse width (pulse width modulation PWM) or controlled frequency (pulse frequency modulation PFM) to drive switch 100.

In PWM switching regulators the switching frequency is constant but the pulse width (therefore the duty cycle) is changed. A DC step-down conversion is achieved by adjusting the proper duty cycle of the switch control signal. For example, to obtain a 3 volt output from a 5 volt input, the duty cycle of the switch control signal will be 3/5 or 60%. The duty cycle of the switch control signal is changed according to the line and load conditions as well. For example, the duty cycle decreases as the load current decreases.

In PFM switching regulators, typically, the off-time of the switching element is kept constant and the frequency of the control signal is varied depending on the input and output conditions. This approach, commonly referred to as constant off-time switching, has the advantage that the system operates mostly in continuous mode, reducing noise and ripple.

FIG. 2 is a timing diagram demonstrating the control signal for PWM and PFM step-down switching regulators. A 50% duty cycle signal with an exemplary 40 μs period is shown at line 200. A switch control signal for a step-down PWM regulator is shown at line 202. To reduce the duty cycle to 40%, the pulse width of the control signal is reduced but the frequency is maintained constant. Signal 204 shows a step-down constant-off PFM regulator switch control signal. In this example, the PFM signal provides the same 40% duty cycle. The constant-off time regulator keeps the duration of the low half cycle at 20 μs but reduces the width of the high half cycle to 13.3 μs to achieve a duty cycle of 40%. The frequency of the signal thus is increased significantly.

While the switching regulators provide an improvement over the linear regulators, their performance does suffer under lower load conditions. This is generally due to a proportional increase in switching loss through parasitic capacitors attendant at the control terminal of the switching transistor. The switching transistor is typically a large power MOSFET with sizable gate-to-source ($C_{gs}$) and gate-to-drain ($C_{gd}$) capacitances. In the case of the PWM switching regulators, the switching frequency remains constant resulting in a constant switching loss that is independent of output current. At lower load currents, the switching loss through $C_{gs}/C_{gd}$ becomes a significantly larger percentage of the overall power. For the constant off time PFM switching regulators, at lower load currents the frequency of the control signal is increased. The switching loss through $C_{gs}/C_{gd}$ increases as the switching frequency at the gate terminal of the transistor increases. Thus, the efficiency of both types of switching regulators is low under low load current conditions.

An improvement for the lower load current performance has been to introduce a sleep (or idle) mode to the operation of the PFM and PWM switching regulators. A sensor inside the switch control circuitry detects the load current, and when it drops below a threshold level, the circuit operates to block most of the switching pulses resulting in a much lower effective switching frequency. Thus, the effective switching frequency is reduced as the load current decreases, reducing the overall switching loss. The transition between sleep mode and regular mode, however, causes larger output ripple and degrades the load regulation. Further, the implementation of the sleep mode requires extra circuitry which adds to circuit complexity and chip area.

There is therefore a need for a switching regulator that can provide DC—DC conversion and operate at all load current conditions without performance degradation and chip area compromise.

SUMMARY OF THE INVENTION

The present invention provides a method and circuitry for a pulse frequency modulated switching regulator whose switching frequency decreases as the load current is reduced. By keeping the on-time of the switch constant, the circuit of the present invention operates to reduce the switching frequency under lower load currents. This in turn reduces switching loss and improves the efficiency of the regulator at low currents. The present invention eliminates the need for a sleep or idle mode. As a result, the load regulation and ripple performance are improved and the corresponding sleep mode circuitry is eliminated.

Accordingly, in one embodiment, the present invention provides for use in a switching regulator a current-controlled oscillator (CCO) circuit including a comparator with a first input coupled to a threshold voltage and an output for providing an output signal, a first current source for controlling an off time of the output signal, and a second current source for controlling the on time of the output signal. The first and the second current sources couple to a second input of the comparator. The control circuit also includes a feedback circuit coupled between the output of the comparator and one of the current sources to switch the current source on and off. The amount of current flowing through the first current source varies while an amount current flowing through the second current source remains constant. Thus, the CCO circuit generates an output signal with constant on-time and variable off-time.

In another embodiment, the present invention provides a method for controlling a switch in a switching regulator comprising the steps of: (A) sensing an output signal of the switching regulator; (B) comparing the output signal with a reference signal; (C) generating an error signal representing a difference between the output signal and the reference signal; and (D) maintaining a constant on-time and adjusting an off-time of the switch in response to the error signal.

A better understanding of the nature and advantages of the constant on-time switching regulator of the present invention may be had with reference to the detailed description below and the accompanying drawings.

DESCRIPTION OF THE PREFERRED EMBODIMENT

The switching regulator of the present invention is designed such that as the load current decreases the frequency of the switching decreases. This is accomplished by maintaining a fixed duration for the high portion of the switch control signal and adjusting the duration of the low portion of the cycle. In one embodiment, the present invention implements this constant on-time switching by a current-controlled oscillator circuit.

Figure 1:
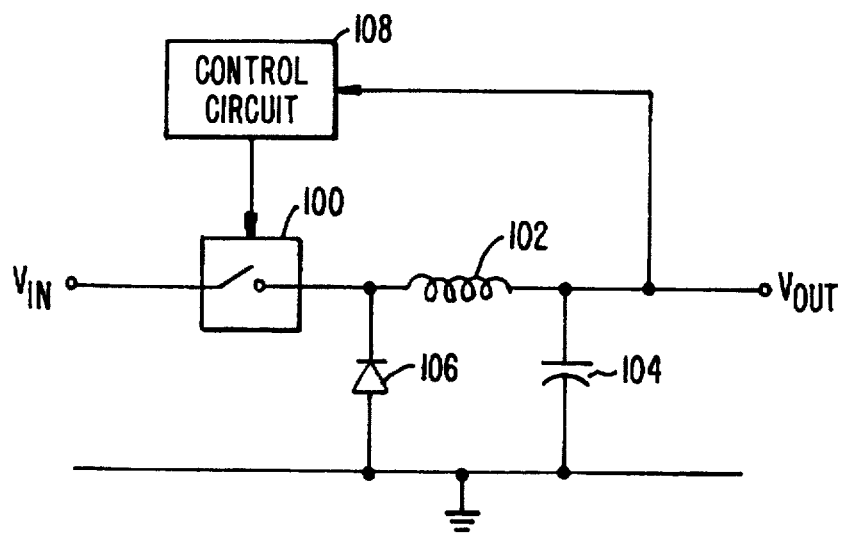
FIG. 1 shows a conventional step-down switching regulator circuit.
Figure 2:
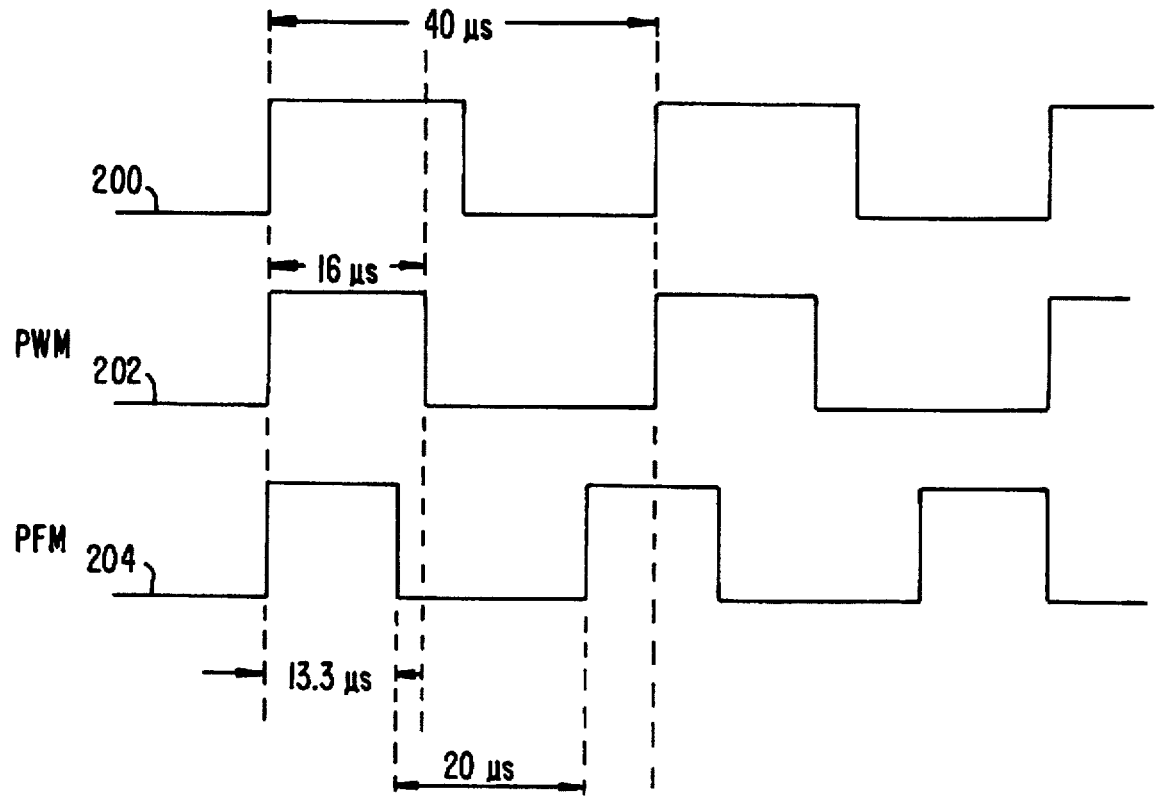
FIG. 2 is a timing diagram illustrating the switch control signals for step-down PWM and PFM switching regulators.
Figure 3:
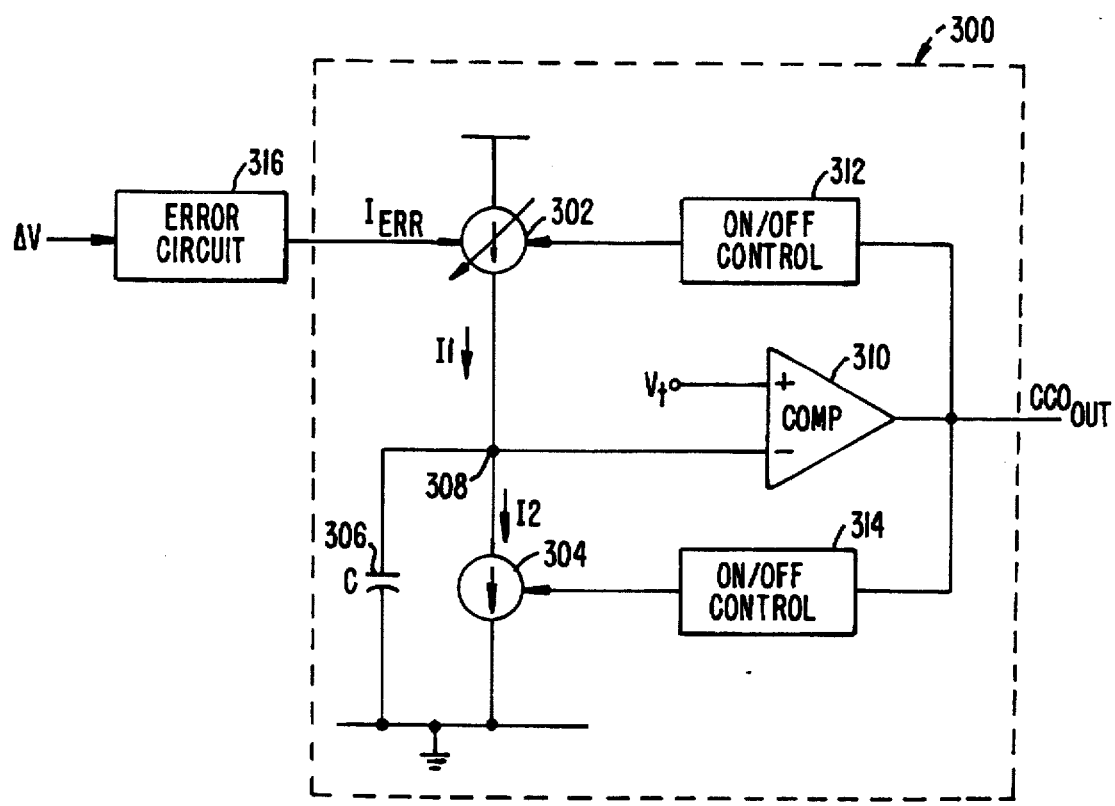
FIG. 3 is a simplified block diagram of a current-controlled oscillator according to the present invention, for use in the constant on-time switching regulator of the present invention.

Referring to FIG. 3, there is shown a simplified block diagram of current-controlled oscillator (CCO) 300 according to the present invention. CCO 300 includes a first current source 302 that sources current I1 into a node 308. A second current source 304 sinks current I2 from node 308 to ground. A timing capacitor C306 connects between node 308 and ground, and is charged and discharged by the two current sources 302 and 304. Node 308 also connects to one input of a comparator 310 whose other input connects to a threshold voltage Vt. The output of comparator 310 provides the CCO output (CCO$_{out}$) that can directly drive the switching element (power transistor not shown). The threshold voltage Vt has two levels Vth and Vtl controlled by the CCO$_{out}$ signal. Hysteresis is thus provided by setting Vt at its high level Vth when CCO$_{out}$ is high, and its low level Vtl when CCO$_{out}$ is low. The CCO$_{out}$ signal is also fed back to both current sources 302 and 304 via on/off control blocks 312 and 314, respectively. The two current sources are turned on and off with opposite polarity signals from the on/off control blocks 312 and 314. An error circuit 316 generates an error signal I$_{err}$ driving current source 302 to adjust the magnitude of I1. It is the magnitude of I1 that sets the off time.

In operation, when the timing capacitor C306 is charged up (by I1) to a voltage above Vth (i.e., when the voltage at node 308 or V$_{308}$ is greater than Vth), CCO$_{out}$ switches low turning on the switching element. When CCO$_{out}$ turns low, control block 314 turns on current source 304 and control circuit 312 turns off current source 302, and Vt is switched from Vth to Vtl. Timing capacitor C306 is discharged by I2 until V$_{308}$ drops below Vtl, at which time the comparator output switches high, turning off the switching element, turning off current source 304, turning on current source 302, and switching Vt from Vtl to Vth. Thus, the capacitor C306 is charged by I1 until V$_{308}$ rises above Vth. Thus, the discharge time determined by I2 sets the length of time COO$_{out}$ remains low which determines the on time of the switching element, and the charge time determined by I1 sets the length of time CCO$_{out}$ remains high which determines the off time of the switching element. Given a constant magnitude for I2, the on time remains constant. The magnitude of I1, and therefore the off time, on the other hand, is varied by I$_{err}$ depending on the input/output condition of the regulator. The charging and the discharging of C306 and the toggling of the comparator output repeats cyclically to generate the desired constant on-time switching signal.

Figure 4:
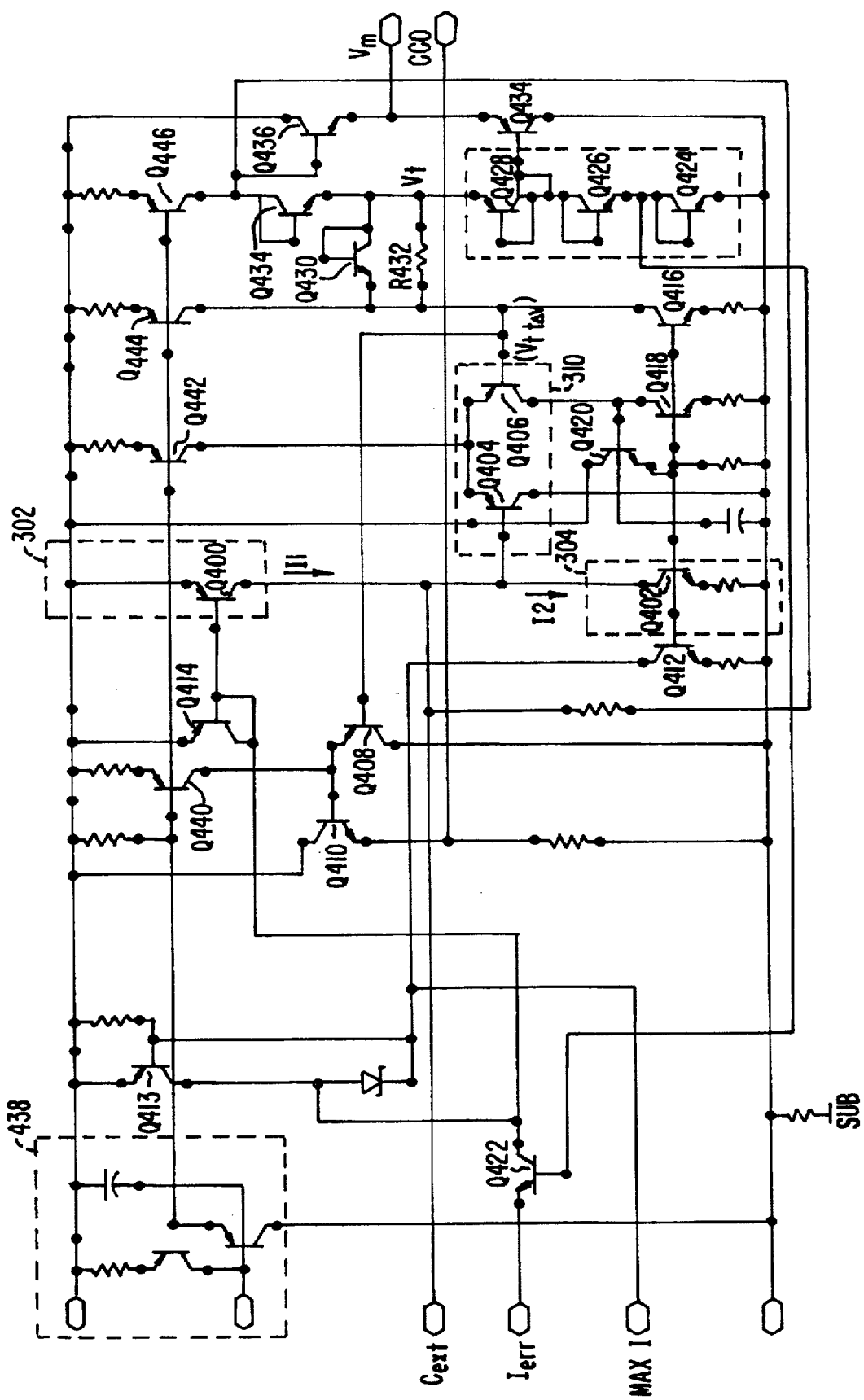
FIG. 4 is one example of a circuit implementation for the current-controlled oscillator of FIG. 3.

An exemplary transistor level schematic for the CCO of FIG. 3 is shown in FIG. 4. The same reference numerals are used for the corresponding blocks in FIGS. 3 and 4. Transistors Q400 (current source 302) and Q402 (current source 304) provide I1 and I2 currents, respectively. A pair of emitter-coupled transistors Q404 and Q406 form comparator 310. The output of comparator 310 is tapped off the base terminal of transistor Q406, is buffered by two emitter-follower transistors Q408 and Q410, and provided at the output terminal CCO$_{out}$. Transistors Q412, Q413 and Q414 implement the feedback control block 312 for I1 current source 302 (transistor Q400), and transistors Q416, Q418, and Q420 implement the feedback control block 314 for I2 current source 304 (transistor Q402). The error signal I$_{err}$ connects to the I1 control circuitry 312 via transistor Q422. Timing capacitor C306 connects to the C$_{ext}$ terminal that connects to the base terminal of comparator transistor Q404.

This circuit implementation of the CCO adds hysteresis to the comparator function. A string of diode connected transistors Q424, Q426, and Q428 set up a fixed threshold voltage Vt (three diode drops) above ground. A hysteresis network made up of the parallel connection of a diode-connected transistor Q430 and a resistor R432 converts Vt to either Vth or Vtl at the base terminal of comparator transistor 406. Transistors Q434 and Q436 provide a buffering action for the mid-reference voltage V$_{mr}$ that is supplied to the rest of the circuitry to calibrate the mid-supply voltage level for the entire circuit. The MAX_I input terminal supplies an active low control signal that provides protection against high current conditions. A bias network 438 sets up the bias currents for the circuit through transistors Q440, Q442, Q444, and Q446.

Figure 5:
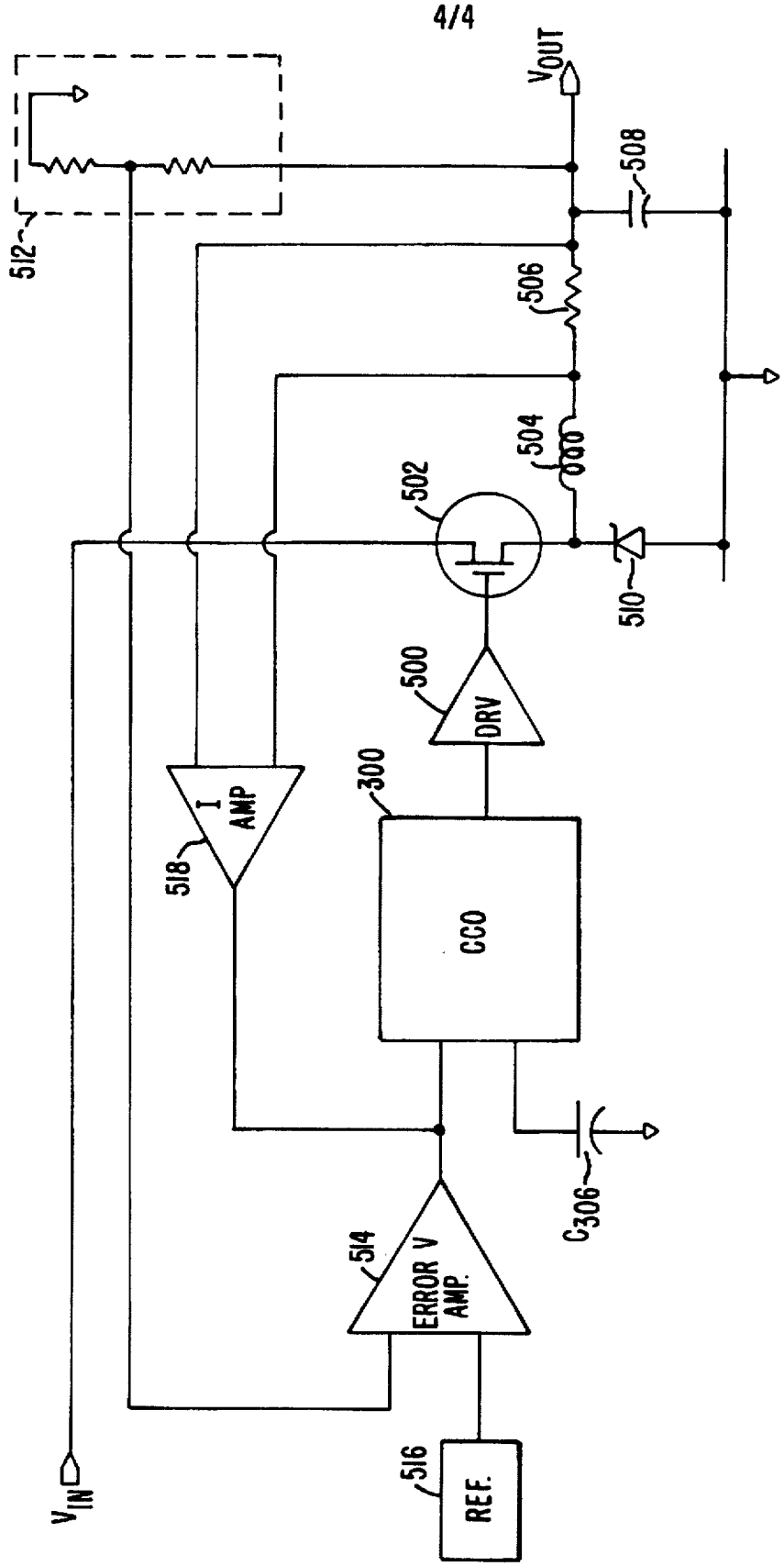
FIG. 5 is a block diagram of the constant on-time step-down switching regulator according to the present invention.

FIG. 5 shows a block diagram of a step-down switching regulator using the CCO according to the present invention. The output of the current-controlled oscillator 300 connects to a driver amplifier 500 whose output drives the gate terminal of a power transistor 502. Power transistor 502 acts as a high speed saturated switch with one terminal connected to the input signal Vin. The other terminal of transistor switch 502 connects to the step-down network including an inductor 504 coupled in series to a resistor 506, a capacitor 508 and a diode 510. The output Vout of the regulator goes through a resistive voltage divider 512 and connects to an input of an error voltage amplifier 514. The other input of the error amplifier 514 connects to an output of a reference voltage generator 516. Reference voltage generator 516 is preferably a very stable reference voltage such as a bandgap reference voltage. Resistor 506 acts as a sense resistor that detects current through inductor 504 and sends the inductor current information to a current amplifier 518. The output of current amplifier 518 also drives the control input of CCO 300. This current feedback improves system stability and line regulation.

The switching regulator of the present invention generates switching pulses only when needed. The lower the load current, the fewer pulses is required to generate the regulated output. Since the on time of the switch is constant and it is the off time that is adjusted, the frequency of the switching is reduced when fewer pulses are required. Therefore, for lower load currents the power consumption of the circuit is reduced and the overall efficiency is improved.

In conclusion, the present invention provides a circuit and method for an improved switching regulator. The switching regulator uses a current-controlled oscillator to implement constant on-time switching. The constant on-time switching results in reduced frequency of switching at lower load currents, and improved overall efficiency of the regulator. Compared with the existing PWM and PFM controllers, the overall performance is improved while the circuitry and chip area is reduced. While the above describes specific embodiments of the present invention, it is possible to use various alternatives, modifications and equivalents. The constant on-time architecture of the present invention, for example, is not limited to the step-down type of switching regulators, and other types of switching regulators may be designed which use a similar technique without departing from the inventive concept. Also, while FIG. 4 shows a circuit implementation of the CCO using bipolar transistors, the CCO can be implemented in CMOS technology. An alternative implementation of the constant on-time architecture of the present invention may, for example, include only the on/off control circuitry (314) for the adjustable current source (304) with a large sinking current that overrides that of the adjustable current source (302), without having to provide for a separate on/off circuitry for the adjustable current source (302). Therefore, the scope of the present invention should be determined not with reference to the above description but should, instead, be determined with reference to the appended claims, along with their full scope of equivalents.

What is claimed is:

1. A switching voltage regulator circuit having an input terminal and an output terminal comprising:
an inductor coupled between the circuit input terminal and the circuit output terminal;
a switch element coupled to said inductor;
a current-controlled oscillator having an output terminal coupled to a control terminal of said switch element, said current-controlled oscillator comprising:
a comparator having a first input terminal coupled to a reference signal, a second input terminal, and an output terminal;
an adjustable current source coupled to said second input terminal of said comparator;
a fixed current source coupled to said second input terminal of said comparator;
a timing capacitor coupled to said second input terminal of said comparator, said timing capacitor being charged and discharged by said adjustable current source and said fixed current source; and
an error circuit having a first terminal coupled to the circuit output terminal and an output terminal coupled to said current-controlled oscillator.

2. The switching voltage regulator circuit of claim 1, wherein said current-controlled oscillator further comprises:
a first control circuit coupled between said output terminal of said comparator and said fixed current source, and
a second control circuit coupled between said output of said comparator and said adjustable current source.

3. The switching voltage regulator circuit of claim 2 wherein said first and second control circuits control an on/off timing of said fixed current source and said adjustable current source, respectively and in a complementary fashion.

4. The switching voltage regulator circuit of claim 2 wherein said output terminal of said error circuit couples to said adjustable current source and adjusts the magnitude of current supplied by said adjustable current source.

5. The switching voltage regulator circuit of claim 1 wherein said switch element is a power metal-oxide-semiconductor field effect transistor (MOSFET).

6. The switching voltage regulator circuit of claim 5 wherein said switching voltage regulator is of a step-down type with said MOSFET being coupled between the circuit input terminal and said inductor, said switching voltage regulator circuit further comprising:
a capacitor coupling the circuit output terminal to ground; and
a diode having an input terminal coupled to ground and an output terminal coupled to said MOSFET and inductor.

7. The switching voltage regulator circuit of claim 1 further comprising a reference voltage generator having an output terminal coupled to a second input terminal of said error circuit.

8. The switching voltage regulator circuit of claim 7 wherein said reference voltage generator is a band gap reference circuit.

9. The switching voltage regulator circuit of claim 1 further comprising:
a sense resistor coupled between said inductor and the circuit output terminal; and
a current amplifier having first and second input terminals coupled across said sense resistor, and an output terminal coupled to said current-controlled oscillator.

10. A switching voltage regulator circuit comprising:
a switch; and
a current-controlled oscillator having an output terminal coupled to said switch for controlling an on/off timing of said switch,
said current-controlled oscillator comprising:
an adjustable current source for charging a capacitor coupled to a negative input terminal of a comparator; and
a fixed current source for discharging said capacitor, said comparator having a positive input terminal coupled to a reference voltage, and an output terminal coupled to said current-controlled oscillator output terminal, wherein, said comparator output terminal feeds back to said adjustable and fixed current sources to control their on/off timing in a complementary fashion, and wherein, an error signal adjusts an amount of current supplied by said adjustable current source.

11. The switching voltage regulator circuit of claim 10 wherein said adjustable current source controls an off-time of said switch and said fixed current source controls an on-time of said switch.

12. The switching voltage regulator circuit of claim 4 wherein said comparator comprises:

- a first bipolar transistor having an emitter terminal coupled to a comparator current source device, a base terminal coupled to said second input terminal, and a collector terminal;
- a second bipolar transistor having an emitter terminal coupled to said emitter terminal of said first bipolar transistor, a base terminal coupled to said first input terminal, and a collector terminal; and
- an output buffer circuit having an input coupled to said base terminal of said second bipolar transistor, and an output coupled to said output terminal of said comparator.

13. The switching voltage regulator circuit of claim 12 wherein said output buffer circuit comprises:

- a first emitter-follower transistor having a base terminal coupled to said base terminal of said second bipolar transistor; and
- a second emitter-follower transistor having a base terminal coupled to an emitter terminal of said first emitter-follower transistor, and an emitter terminal coupled to said output terminal of said comparator.

14. The switching voltage regulator circuit of claim 12 further comprising a hysteresis circuit, said hysteresis circuit comprising:

- a plurality of serially coupled diode-connected transistors generating a reference voltage at an output;
- a diode-connected bipolar transistor having a base/collector terminal coupled to said reference voltage, and an emitter terminal coupled to said first input terminal of said comparator; and
- a resistor having a first terminal coupled to said reference voltage, and a second terminal coupled to said first input terminal of said comparator.

15. The switching voltage regulator of claim 12 wherein said adjustable current source comprises a bipolar transistor having an emitter terminal, a base terminal coupled to said output terminal of said error circuit, and a collector terminal coupled to said second input terminal of said comparator.

16. The switching voltage regulator of claim 12 wherein said fixed current source comprises a bipolar transistor having a collector terminal coupled to said second input terminal of said comparator, a base terminal coupled to said first input terminal of said comparator and an emitter terminal.

* * * * *